3,579,628
DRESSING FILM
Robert J. Gander, Whitehouse, and David T. Rovee,
Hopewell, N.J., assignors to Johnson & Johnson
No Drawing. Filed July 3, 1967, Ser. No. 650,599
Int. Cl. A61l *15/00, 15/01, 15/03*
U.S. Cl. 424—28          11 Claims

ABSTRACT OF THE DISCLOSURE

Dressings having a hydrophilic acrylic film component adapted to contact a wound surface are prepared in which the wound contacting film is insoluble in body fluids but has a substantial affinity for water. Moisture absorbed by the film acts to plasticize the film and provide a moist, flexible, conforming surface to the underlying wound tissue. The dressing may consist of a single piece of the hydrophilic acrylic film or the film may form a part of a composite dressing wherein the wound contacting surface of the dressing is formed of a hydrophilic acrylic film. The hydrophilic acrylic films are particularly suitable for use as occlusive dressings and for controlling the proliferation of bacteria where the same have, dispersed therethrough, compositions which react with water to generate a bacteriostatic substance. Where the film base is a hydrophilic acrylic the effectiveness of the presence of the bacteriostat-generating materials, when present, is appreciably increased while any chance of tissue irritation is substantially reduced.

BRIEF SUMMARY OF THE INVENTION

Organic films are finding increasing use both as dressings and as dressing components wherein the film is placed in direct contact with the wound surface or with the skin of a patient. Recent work has shown that there is a tendency for wounds to heal more rapidly if the dressing used is occlusive in nature, i.e., if it either prevents or substantially inhibits the escape of moisture from the wound area. (Nature, Dec. 26, 1963, Biology—Effect of Air Exposure and Occlusion on Experimental Human Skin Wounds, pp. 377–379.) One of the difficulties involved with such occlusive dressings, however, is that the moist area in any pockets that may develop between the film and the underlying surface of the skin or wound apparently provide an excellent environment for bacteria proliferation with the result that bacteria proliferation is rapid. This necessitates the periodic removal of the dressing and treatment of the underlying surface to keep the bacteria contamination down. In copending application 650,650 filed of even date herewith now abandoned is described and claimed broadly films and film dressings containing therein materials which, on reaction with water, generate in the film a bacteria proliferation inhibiting material.

The present invention is directed to water insoluble hydrophilic film dressings both with and without bacteriostat, i.e., bacteria proliferation inhibiting characteristics. The wound contactng films of the present invention have a substantial affinity for water, and, though they themselves are insoluble in water, absorb sufficient quantities of water to plasticize the same to such extent that physical properties, such as flexibility and conformability are noticeably changed. The film-forming polymers used in making the dressings when cast into film form, without the addition of other hydrophilic materials, have an absorption capacity for water of about 7% to over 100% of their own weight.

The hydrophilic acrylic polymer films of the dressings of the present invention contain a large number of hydrophilic oxygen present in the form ester ketone 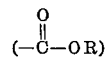

or acid 

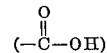

or hydrophilic nitrogen and oxygen in the form N-alkyl amide

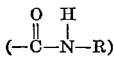

where R is a carbon chain of 1–4 carbons. The hydrophilic groups are incorporated into the polymer through monomers containing the same; at least 50% by weight of the polymer having interpolymerized therein an acrylate or methacrylate monomer containing one of the aforementioned hydrophilic groups. These hydrophilic acrylic films with their high degree of moisture absorption make the films especially effective for bacteria proliferation control when the same are prepared with a bacteriostat-generating material dispersed therethrough as hereinafter more fully described. When the dressing films are subjected to moist conditions, the bacteriostat-generating materials react to generate a bacteriostatic substance which effectively controls bacteria proliferation. Thus, where the film is used in a dressing, as when the same is applied to a moisture exuding surface such as intact skin or an open wound, bacteria proliferation immediately under the dressing is controlled.

When compositions of this type are incorporated in the water-insoluble highly hydrophilic film of the dressing, the water-absorbing character of the film not only improves the conformability of the same, improving contact with the underlying tissue, but apparently also beneficially affects the generation and release of the bacteriostatic agent the same being appreciably more effective when generated in such films. Also, the release of the bacteriostatic agent is so controlled that no irritating effect on the underlying living tissue, even with open wounds, is noted while substantial inhibition of bacteria proliferation in the immediate vicinity of the film is obtained. Bacteriostat-generating substances are illustrated, for example, by the formaldehyde generating polymers and polymers that generate alkyl cyanoacetate when reacted with water.

DESCRIPTION OF THE INVENTION

In preparing the films forming the wound-contacting surface of the dressings of the present invention, polymers

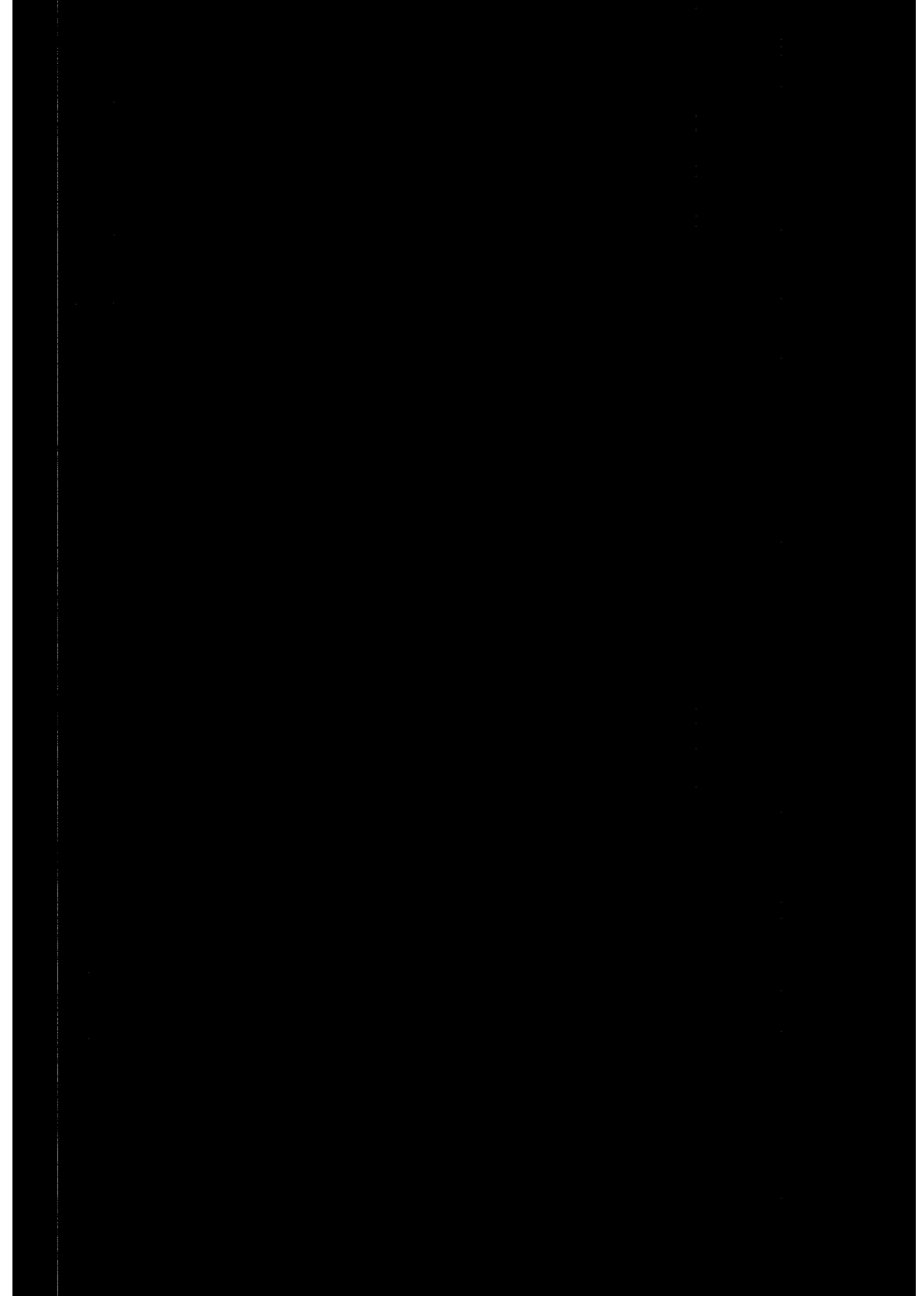

TABLE A.—WATER ABSORPTION OF HYDROPHILIC POLYMER FILM DRESSINGS

| | | Water absorption, percent | | | | | |
|---|---|---|---|---|---|---|---|
| | | Film without additive | | | Film with 10% crosslinked urea-formaldehyde resin | | |
| Polymer | Composition [1] | 1 day | 2 days | 5 days | 1 day | 2 days | 5 days |
| 385 | 60 BA-40 BACA | 16 | 18 | 35 | 48 | 64 | 100 |
| 1172 | 50 EA-50 ViAc | 12 | 15 | | 82 | 81 | 85 |
| 1179 | 75 BA-25 AA | 34 | 32 | 52 | 153 | 148 | 251 |
| 1184 | 40 BA-60 DAA | 7 | 12 | 21 | 80 | 106 | 105 |
| 1185 | 40 BA-13 AA-47 ViAc | 21 | 30 | 30 | 122 | 222 | 195 |
| 1188 | 90 MA-10 AA | 50 | 85 | 230 | 164 | 188 | 400 |
| 1189 | 43 BACA-57 DAA (with 30% Santicizer 160) | 16 | 8 | 19 | 80 | 71 | 143 |
| 1190 | 60 BA-40 IACA | 24 | 37 | 28 | 90 | 116 | 140 |
| | 85 ViCl-15 ViAc | 0.5 | | | | | |
| | 40 CAB-60 Santicizer 141 | 1 | | | | | |
| | 100 BMA | 3.5 | | | | | |

[1] BA, n-butyl acrylate; BACA, N-tert.-butylacrylamide; EA, ethyl acrylate; ViAc, vinyl acetate; AA, acrylic acid; DAA, diacetone acrylamide; MA, methyl acrylate; IACA, N-isopropylacrylamide; Santicizer 160, butyl benzyl phthalate.

Among suitable water-insoluble additive materials for further increasing the water-absorption characteristics of the polymer film are water-absorbing crosslinked polymers such as crosslinked urea-formaldehyde condensation resins, polyvinyl alcohol, polyvinylpyrrolidone, sodium corboxymethyl cellulose, hydroxyethyl cellulose and hydroxypropyl cellulose.

Bacteriostat-generating materials are those compounds and polymers which, when reacted with water, generate a substance having bacteriostatic properties. The preferred bacteriostat-generating materials of this type are those which react slowly with water to liberate formaldehyde. Some examples of materials of this type are crosslinked urea-formaldehyde condensation resins, poly(alkyl 2-cyanoacrylates) in which the alkyl group contains 1 to 12 carbons, such as poly(methyl 2-cyanoacrylate) and poly(n-butyl 2-cyanoacrylate) and polyvinylidene cyanide.

Materials of the poly(alkyl 2-cyanoacrylate) class when reacted with water not only form formaldehyde, but alkyl cyanoacetates which have bacteriostatic properties.

Inhibition of bacteria proliferation under occlusive film dressings through incorporation of bacteriostat-generating material in the dressing film is well illustrated by the test results given in the following Table B. Table B also illustrates the increasing effectiveness of bacteria proliferation inhibition with increasing water absorption rate of film used.

The results tabulated in Table B are average results taken from several subjects. The reduction of bacteria proliferation is shown by the difference in bacteria count obtained under an occlusive dressing of the film without bacteriostat-generating material as a control and that under an adjacent occlusive dressing of the same polymer film containing the bacteriostat-generating material. This difference in bacteria count is given in multiples of 10.

another film of the same polymer composition and of equal thickness to the control but containing therein the bacteriostat-generating material (experimental film). The experimental film is secured in the same manner as is the control. The film dressings are 2 inches by 2 inches. They are kept in place for 48 hours after which they are removed and bacterial samples immediately taken from the skin areas covered by films. The sample is taken by placing a sterile hollow plastic cylinder covering ca. 700 mm.$^2$ of skin onto the area of skin to be tested. Into the cylinder is pipetted 1.5 ml. sterile physiological saline and the skin is scraped vigorously with the tip of the pipette for 30 seconds. Then, 1.0 ml. of the saline in the cylinder is removed and placed into a 9 ml. sterile saline blank and appropriate dilutions, generally about $10^{-3}$, made and plated in brain heart infusion agar plus 1% Tween 80. Plates are incubated for 48 hours at 37° C., after which colonies can be counted, the degree of dilution being taken into account.

It becomes readily apparent from examination of the values in the above Table B that the effectiveness of bacteria proliferation control is substantially increased as the ability of the film to absorb water increases. The water-absorption ability of the film is measured by the amount of water absorbed, as shown by an increase in weight, by the film after having been immersed in water at 100° F. for the period indicated.

The water-insoluble hydrophilic film dressings of the present invention appear to possess bacteria proliferation inhibiting properties even without the presence of a bacteriostat-generating material as shown in the values tabulated in Table C. However, better bacteria proliferation control is obtained with the inclusion of a bacteriostat-generating material. The bacteriostat-generating material utilized in Table C, referred to as Resin, is a crosslinked TABLE B.—REDUCTION IN BACTERIA COUNT UNDER OCCLUSIVE FILM DRESSINGS THROUGH INCLUSION OF 10% BY WEIGHT OF POLY(METHYL 2-CYANOACRYLATE)

| Film | Composition percent [1] | MVT for 5-mil films, g./100 sq. in./24 hrs. | 48-hr. water absorption, percent | Occlusive tests on intact human skin, reduction in bacteria count over control | Irritation |
|---|---|---|---|---|---|
| SCAN® | 40 CAB-60 Santicizer 141 | 55 | 1 | $10 \times 10^{1.6}$ | None. |
| VYHH | 85 ViCl-15 ViAc | 3 | 0.5 | $10 \times 10^{1.0}$ | Do. |
| 1153 | 65 ViCl$_2$-30 BA-5AA | 1 | 8 | $10 \times 10^{1.2}$ | Do. |
| 1171 | 40 BA-60 ViAc | 88 | 7 | $10 \times 10^{1.4}$ | Do. |
| 1167 | 100 BMA | 31 | 3.5 | $10 \times 10^{3.2}$ | Do. |
| 1172 | 50 EA-50 ViAc | 112 | 23 | $10 \times 10^{4.5}$ | Do. |
| 385 | 60 BA-40 BACA | 28 | 28 | $10 \times 10^{4.6}$ | Do. |

[1] CAB, cellulose acetate butyrate; Santicizer 141, 2-ethylhexyl diphenyl phosphate; ViCl, vinyl chloride ViAc, vinyl acetate, ViCl$_2$, vinylidene chloride; BA, n-butyl acrylate; AA, acrylic acid; BMA, n-butyl methacrylate; EA, ethyl acrylate; BACA, N-tert.-butylacrylamide.

The data for bacteria growth inhibition and bacteria counts are obtained in the following manner:

A strip of film of particular polymer composition (control) is placed on the intact skin of a human subject. Over this film is placed another less permeable film (Saran® film) and both are taped in place. The outer impermeable film serves only to assure the maintenance of a high humidity on the skin, and hence, good conditions for bacteria proliferation. Adjacent to this dressing is placed urea-formaldehyde resin. It is believed that formaldehyde is formed by hydrolysis of methylol groups substituted on the nitrogen atoms of the urea units. The hydrolysis reaction occurring on a chain end of the urea-formaldehyde resin may be represented as follows:

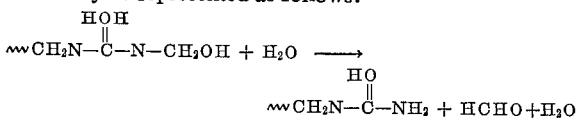

after 24 hours of 0.065 milligrams of formaldehyde per gram of film.

The copolymer film containing the poly(methyl 2-cyanoacrylate) and a sample of the same film without this polymer are examined by the procedure previously described. Bacterial populations are found to be as follows:

| Uncovered skin control | Film [1] | Film with cyanoacrylate [1] |
|---|---|---|
| 55 | 38×10⁴ | <10 |
| 27×10 | 74×10⁵ | 16×10² |
| 35 | 63×10⁵ | 78×10 |
| 20 | 41×10⁵ | 30 |
| 98×10² | 14×10⁶ | 20×10² |
| 17×10 | 94×10⁵ | 33×10³ |
| 12×10 | 39×10⁶ | <10 |
| <10 | <10 | 48×10 |
| 15×10 | 26×10⁵ | 22×10² |
| 29×10 | 60×10⁵ | 20 |
| 65×10 | 27×10⁵ | 55 |
| 25×10 | 31×10⁵ | 67×10² |
| <10 | 81×10 | 34×10 |

[1] Occluded.

Example III

A three-neck reaction flask with a water condenser, mechanical stirrer, thermometer, and a nitrogen inlet tube is charged with 135 parts by weight of methyl acrylate, 15 parts of acrylic acid, and 125 parts of ethyl acetate. This solution is stirred for 15 minutes and swept with a slow stream of nitrogen while the temperature is raised to 70° C. by immersing the flask in an electrically-heated oil bath. Nitrogen flow is then discontinued and a solution of 1.5 parts of benzoyl peroxide in 25 parts of ethyl acetate is added. After an induction period of about 10 minutes, an exothermic polymerization occurs which causes the temperature to rise to 85° C. The reaction mixture thickens, and during the next thirty minutes 225 parts of ethyl acetate are added to reduce the viscosity. The temperature of the reaction is then maintained at 80° C. for the next 3.5 hours and stirring is continued. The reaction mixture is then cooled and dissolved in 1000 parts of methanol. The methanol-ethyl acetate solution is poured in a thin stream into about 9000 parts of cold, stirred water. The precipitated copolymer is washed in running water and dried overnight at 60–70° C. The copolymer has a relative viscosity of 2.22 (1.000 g./100 ml., cyclohexanone, 30° C.).

Films 2 to 5 mils in thickness are made by casting a 20 percent solution of the copolymer in ethyl acetate on silicone-coated paper and drying at room temperature. The film is flexible and has a dry surface feel. When soaked in water the film absorbs water rapidly, showing a weight increase of about 50 percent in one day and about 225 percent in five days. The water-swollen film is extremely soft and conformable with a strong tendency to stick to itself and many other surfaces.

Example IV

Separate films are prepared of the copolymer of Example I. The bacteriostat-generating materials are added at a concentration of 10 weight percent of the copolymer utilizing the pebble-milling procedure described in Example II. In this manner separate films are prepared, each containing a different bacteriostat-generating material. The bacteriostat-generating materials incorporated are poly(n-butyl 2-cyanoacrylate), polyvinylidene cyanide and crosslinked urea-formaldehyde resins. The films containing the urea-formaldehyde resins exhibit different degrees of formaldehyde release, depending on the extent of crosslinking in the resin. A moderately cured resin liberates 2.06 milligrams of formaldehyde per gram of film in the in vitro test. A more completely cured resin liberates 0.43 milligram of formaldehyde per gram of film. These films all have bacteria-inhibiting properties.

Example V

A monomer solution is prepared by blending 75 grams of ethyl acrylate, 75 grams of vinyl acetate and 125 grams of ethyl acetate. A peroxide solution is made by dissolving 1.5 grams of benzoyl peroxide in 25 grams of ethyl acetate. A one-liter reaction flask with accessory equipment as described in Example I is provided with two dropping funnels. The monomer solution is placed in one funnel and the peroxide solution in the other. Seventy-five milliliters of the monomer solution is run into the flask, stirred, and heated to 70° C., while the flask is swept with a slow stream of nitrogen. After 15 minutes the nitrogen is shut off, and 10 ml. of the peroxide solution are added. During the next 20 minutes, the remaining monomer solution and peroxide solution are added gradually to the flask while the temperature is maintained at about 75° C. Toward the end of the addition the exotherm of polymerization raises the temperature to about 85° C. Stirring is continued for 3.5 hours after the exotherm subsides, while the temperature is maintained at 80° C. The reaction mixture is then diluted with 76 g. of ethyl acetate and cooled. It is dissolved in 1000 ml. of methanol. The copolymer is precipitated in 9 liters of water as described in Example I, washed in water, and dried at 60–70° C. Relative viscosity of the copolymer is 1.86 (1.000 g./100 ml., toluene, 30° C.).

Laminates of film to silicone-coated paper are prepared by casting a 20 percent ethyl acetate solution of the copolymer on the silicone-coated paper and air drying. The film has a slightly tacky surface, but it is very flexible and shows excellent conformation to body contours. It absorbs water when soaked in water or when worn on human skin. Adherence to human skin is particularly good, even after the film is swollen with water. By soaking in water at room temperature for two days, the film increases in weight by about 15 percent.

Particular embodiments of the invention have been used to illustrate the same. The invention, however, is not limited to these specific embodiments. In view of the foregoing disclosure, variations and modifications thereof will be apparent, and it is intended to include within the invention all such variations and modifications except as do not come within the scope of the appended claims.

Having thus described our invention, we claim:

1. A dressing comprising a flexible water-insoluble water-plasticized hydrophilic acrylic polymer film the polymer of said film having been thoroughly washed removing water-soluble fractions and having, without additives, a moisture-absorption capacity of at least 7 percent of its own weight and containing hydrophilic moieties selected from the group consisting of hydrophilic oxygens in the form of an ester

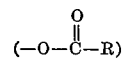

a ketone

an acid

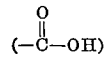

and an N-alkyl substituted amide

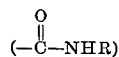

where R is a carbon chain of 1 to 4 carbons, the polymer of said film containing in interpolymerized form, at least 50 percent by weight of acrylic monomer containing at least one of said hydrophilic moieties.

2. A dressing of claim 1 wherein said hydrophilic acrylic polymer film to be applied as a dressing is releasably bonded to a flexible carrier sheet, said film being removably adhered to said carrier sheet for easy handling and removed from said carrier sheet on application as a wound covering.